Patented Nov. 24, 1925.

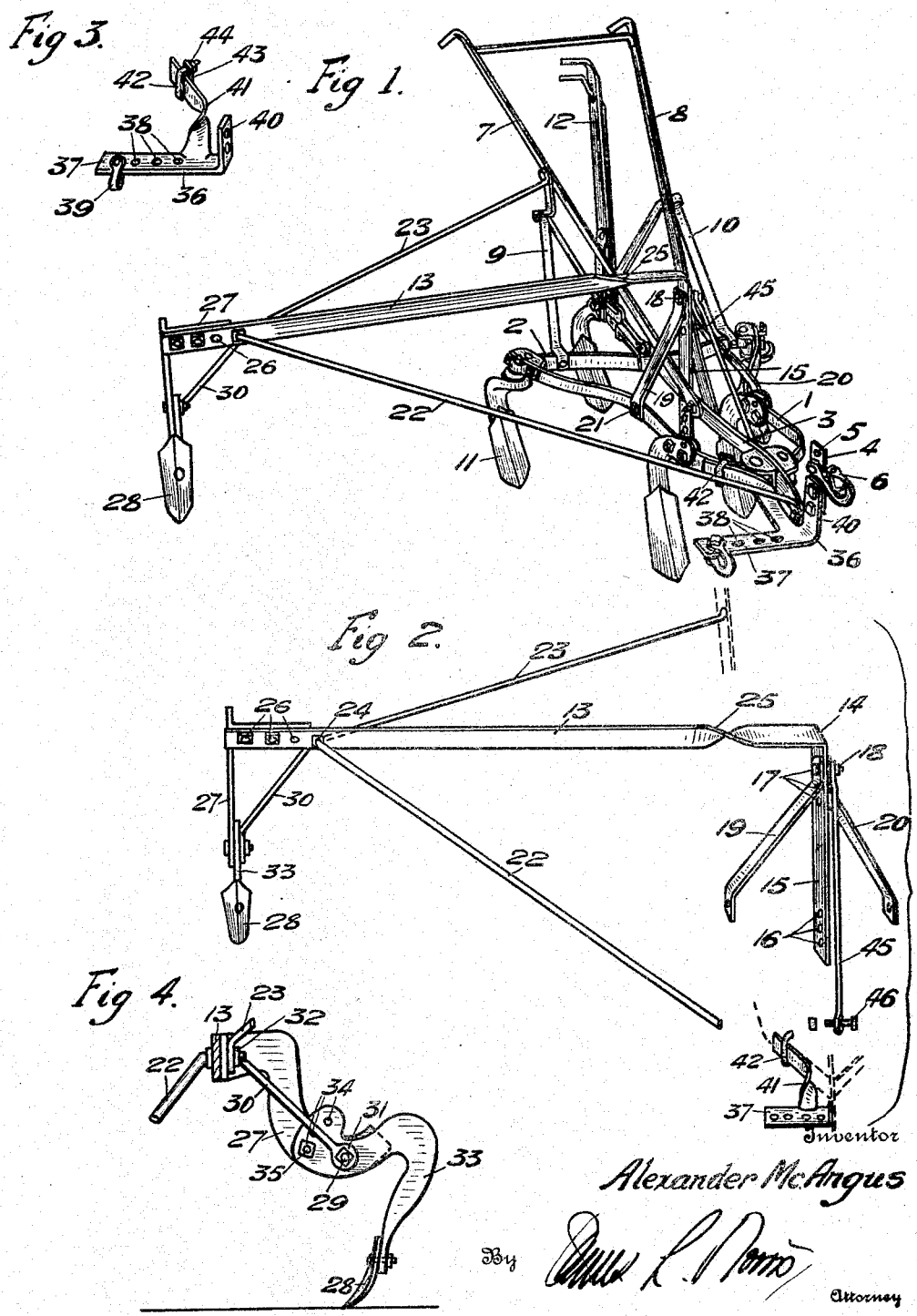

1,563,208

UNITED STATES PATENT OFFICE.

ALEXANDER McANGUS, OF HONOLULU, TERRITORY OF HAWAII.

ATTACHMENT FOR CULTIVATORS.

Application filed May 25, 1922. Serial No. 563,594.

*To all whom it may concern:*

Be it known that I, ALEXANDER MCANGUS, a citizen of the United States, and resident of Honolulu, city and county of Honolulu, Territory of Hawaii, do hereby declare that I have made a new and useful Invention in Attachments for Cultivators, of which the following is a specification.

This invention relates to attachments for cultivators and has for its object the provision of means whereby to make possible the cultivation, at one operation with a single machine, of land where crops are so planted that the spaces between the rows of plants are alternately wide and narrow, and applies particularly to the cultivation of pineapples and possibly corn.

With cultivators as are now available it is only possible to cultivate land where the rows of plants are equally spaced or to cultivate in two operations, first with a broad cultivator in the wide rows and with a smaller cultivator in the narrow rows.

The present improvement comprises an iron or steel attachment capable of being secured to any of the existing standard forms of cultivators and includes an auxiliary cultivating implement or weeder which extends sidewise from the main cultivator, while the latter is being operated in a wide row, over into the adjacent narrow row where it simultaneously performs a cultivating operation.

Another object of the invention is the provision in combination with the cultivator attachment of a detachable draw-bar extenson for equalizing the draft upon the cultivator when the attachment is in place.

With the above and other objects in view, my invention consists in the improved attachment for cultivators illustrated in the accompanying drawings, described in the following specification, and particularly claimed, and in such variations and modifications thereof as will be obvious to those skilled in the art to which my invention relates.

In the drawings accompanying and forming a part of this specification, and wherein the preferred embodiment of my invention is illustrated:—

Figure 1 is a perspective view of a standard cultivator with my improved attachment secured in operative relation thereto.

Figure 2 is a perspective view of the cultivator attachment removed from the cultivator.

Figure 3 is a perspective view showing the draw-bar extension and Figure 4 is a sectional view showing the adjustable cultivating tool forming part of my improved attachment.

Referring now in detail to the several figures, the numeral 1 represents the frame of a standard cultivator which consists of a bow-shaped member bent in the form as shown and provided with a rear cross piece 2 and a draw-bar 3, the latter being provided forwardly with an upstanding hooked end 4 provided with a plurality of apertures 5 which form a row of points for the selective pivotal connection of the hitch hook 6. At a point on the draw-bar intermediate its forward end and the rack piece 2 the cultivator handles 7 and 8 are bolted, said handles extending upwardly in an inclined position and being braced by the upright members 9 and 10. This cultivator is of the usual construction which includes the cultivator teeth 11 and the expanding lever 12 and, in so far as it has been described up to this point, constitutes no part of my invention.

That which is new, and which I desire to cover in the following claims, both per se and in combination with the cultivator comprises a bar 13, best shown in Figure 2, which extends to one side of the cultivator and is bent at a right angle at 14 to provide a downwardly extending vertical portion 15 having a plurality of apertures 16 near its lower end adapted to be bolted to the draw-bar 3 of the cultivator, said apertures providing means by which the height of the bar 13 above the ground may be adjustably varied. The upper end of the vertical portion 15 is likewise provided with a plurality of apertures 17 for the selective reception of a bolt 18 by means of which two braces 19 and 20 are secured to opposite sides of said vertical portion. The lower ends of said braces bolt to the opposite sides of the frame 1 of the cultivator, as shown at 21 in Figure 1. Another brace 45 joins the vertical portion 15 to the forward part of the draw-bar, being bolted thereto by bolt 46 shown in Figure 2, and prevents the backward sway of the bar 13 when under load.

The bar 13 is further rigidly secured to the cultivator structure by means of forward and rear braces 22 and 23, the former of which passes through an aperture 24 in said bar, the brace 23 having an eye which surrounds the projecting end of the bar 22. Said braces are secured, respectively, to the front end of the draw-bar 5 and to the handle 7 of the cultivator at the point where it is joined by the upright 9, as shown in Figure 1. The bar 13 is further stiffened by being angularly twisted at the point 25 so as to cause it to lie with its longer cross sectional dimension in a vertical plane.

The outer end of the bar 13 is formed with a plurality of holes 26, affording adjustable connections for the bracket 27 which carries the auxiliary cultivator tooth 28. It is within the scope of the invention to substitute any form of soil-agitating implement for the cultivator tooth 28. Said cultivator tooth is pivotally mounted in the lower end of the bracket 27 by means of the pivot bolt 29, best shown in Figure 4, which passes through said tooth and bracket and also forms anchoring means for the stay rod 30 which has an eye 31 in its lower end passing around said bolt, the other end of said stay rod being secured to the bar 13 by means of the nut 32 which engages the threaded end of the forward brace 22 drawing said forward brace, bar 13, bracket 27 and rear brace 23 clampably together, as clearly shown in Figure 4. The upper end of the shank 33 of the auxiliary cultivator tooth is formed with a plurality of apertures 34 capable of selective alignment with an aperture in the bracket 27 through which apertures the bolt 35 passes for securing the shank of said cultivator tooth in any position of adjustment.

In order to equalize the draft when using my improved cultivator attachment, an extension to the regular draw-bar is provided which consists of a forging 36, best shown in Figures 1 and 3, having a horizontal portion 37 provided with a plurality of holes 38 affording selective means for the attachment of the hitching clevis 39. Said forging is also formed with a vertical portion 40 adapted to be bolted into one of the draft apertures 5 of the draw-bar 4, and a twisted portion 41 so shaped as to lie flat against the forward portion of the frame 1 of the cultivator and to be secured clampably thereto by means of the U-bolt 42 having the clamping plate 43 slidably carried by the limbs thereof and engaged by the nuts 44.

In operation the cultivator attachment is secured to the standard cultivator in a manner which is obvious from the foregoing description, the cultivator tooth 28 being set to a proper width by positioning the bracket 27 relative to the bar 13 through the agency of the apertures 26. The height of the bar 13 is determined by the adjustment of the vertical portion 15 thereof relative to the cultivator frame by means of the apertures 16 and 17. The draft is equalized by adjusting the hitching clevis in the appropriate one of the apertures 38 and the cultivator is operated by driving it between two widely spaced rows of plants with the auxiliary cultivator tooth 28 operating in the adjacent space between the two narrowly spaced rows. It is obvious that in making the lateral adjustment of the bracket 27, several of the rods 30, of different length, may be kept conveniently at hand, from which one of appropriate length may be selected to meet the requirements of the adjustment.

It is the work of but a few minutes to disconnect my improved attachment from the cultivator by unbolting the brace 23 from the handle 7 and the brace 22 from the draw-bar 3, detaching the braces 19 and 20 from the frame 1, the vertical portion 15 of the bar 13 from the draw-bar and removing the stay bolt 46. The draw-bar extension 36 may be removed or left in place as desired, since it in no way interrupts the proper functioning of the cultivator.

Although I have thus described the preferred embodiment of my invention, it is evident that those skilled in the arts to which this relates may make various changes in the construction, combination and arrangement of the several parts without departing from the spirit and scope of the invention.

Having described my invention what I claim as new and desire to secure by Letters Patent, is:—

1. An attachment for cultivators, comprising an implement-carrying bar having a part adapted for connection with a cultivator and another part adapted to extend laterally from said cultivator, a ground-engaging implement pivotally connected to said bar at a point offset from said laterally-extending portion of the latter and adjustable about its pivotal axis, said attachment including a system of bracing comprising rods, one extending from the pivotal axis of said implement to a point between the ends of the laterally-extending portion of said bar and the others having one of their ends connected to said point on said bar and their other ends adapted, respectively, for connection to separate points on said cultivator.

2. An attachment for a cultivator embodying a frame and a draw bar, said attachment comprising a member adapted for connection to said cultivator and to extend laterally from the latter, said member having a vertical portion adapted to be secured to the draw bar for adjustment in a vertical direction, braces secured to opposite sides of said vertical portion and adapted to be connected to the frame of said cultivator, a bracket supported by the outer end of said bar and adjustable relative thereto in a lateral direction, an auxiliary cultivating implement carried by said bracket, a forward and rear brace each adapted to be secured at one end of said cultivator, one of said braces passing through aligned apertures in the outer end of said bar and in said bracket and projecting therebeyond, the other of said braces having an eye at its outer end surrounding the projecting end of said one brace and means for clampably securing said bar, bracket and forward and rear braces together.

3. An attachment for a cultivator embodying a cultivator frame and a draw bar, said attachment comprising a member adapted for connection with said cultivator and to extend laterally from the latter and having a vertical portion adapted to be secured to the draw bar of the cultivator for adjustment in a vertical direction, braces secured to opposite sides of said member and adapted to be secured to the frame of said cultivator, a bracket supported by the outer end of said member and adjustable relatively thereto in a lateral direction, an auxiliary cultivating implement carried by said bracket, and pivotally secured thereto, said implement being adjustable about its pivotal axis in a direction longitudinally of the cultivator, a stay rod supported at one end by the pivotal connection of said implement with said bracket, the other end of said stay rod being provided with an eye surrounding the outer end of one of said braces and means for securing said braces and stay rod together.

4. In combination with a cultivator, including a cultivator frame and draw-bar, a member extending laterally from said cultivator and having a vertical portion adjustably secured to said draw-bar in a vertical direction, braces secured to opposite sides of said vertical portion and to the frame of said cultivator, a second brace secured to said vertical portion at one end and at its other to the draw-bar forwardly of said vertical portion, and a ground-engaging implement carried by said member.

In testimony whereof I have signed my name to this specification.

ALEXANDER McANGUS.